United States Patent

[11] 3,556,079

| [72] | Inventor | Haruo Omizo<br>Izumi-Otsu, Japan (7 of No. 11,<br>Sukematsucho-2-chome Izumi-Otsu City,<br>Prefecture of Osaka) |
| --- | --- | --- |
| [21] | Appl. No. | 718,474 |
| [22] | Filed | Apr. 3, 1968 |
| [45] | Patented | Jan. 19, 1971 |
| [32] | Priority | May 16, 1967 |
| [33] | | Japan |
| [31] | | No. 42/31058 |

[54] METHOD OF PUNCTURING A MEDICAL INSTRUMENT UNDER GUIDANCE OF ULTRASOUND
5 Claims, 23 Drawing Figs.

[52] U.S. Cl. ........................................................ 128/2, 128/24
[51] Int. Cl. ....................................................... A61b 5/10, A61h 1/00
[50] Field of Search ............................................. 128/2, 2.05, 24.05; 340/18; 73/151, 152

[56] References Cited
UNITED STATES PATENTS
3,237,623  3/1966  Gordon ................... 128/24.05

OTHER REFERENCES
The Journal of the Acoustical Society of America-Volume 29, Number 11 - November 1957- "Ultrasonic Doppler Method for the Inspection of Cardiac Functions" by Satomura

*Primary Examiner*—Richard A. Gaudet
*Assistant Examiner*—J. B. Mitchell
*Attorney*—Wenderoth, Lind & Ponack ABSTRACT: A method of inserting a medical instrument under guidance of ultrasound, which is characterized by transmitting an ultrasonic beam toward the internal parts of the human body, receiving backscattered waves which have changed their frequency in accordance with the Doppler effect caused by the movement of a part of the internal parts, and utilizing the backscattered waves as a guide to insert a medical instrument such as a puncture needle so that the instrument can approach or reach or puncture the part easily.

PATENTED JAN 19 1971 3,556,079
SHEET 1 OF 3
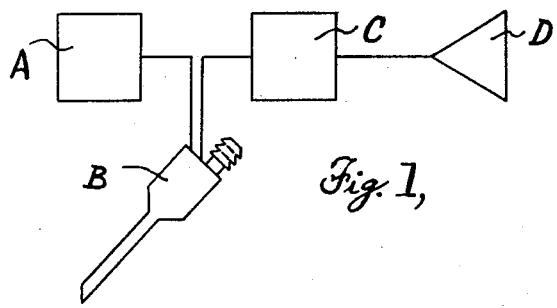
Fig. 1,
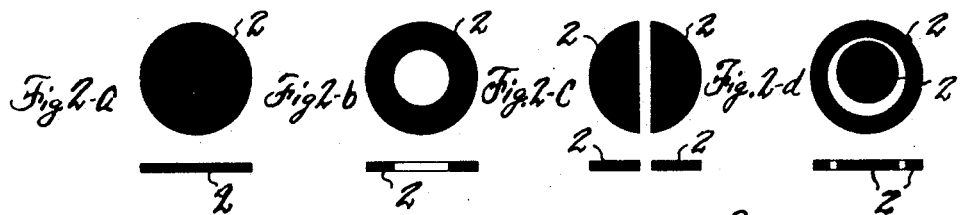
Fig. 2-a, Fig. 2-b, Fig. 2-c, Fig. 2-d,
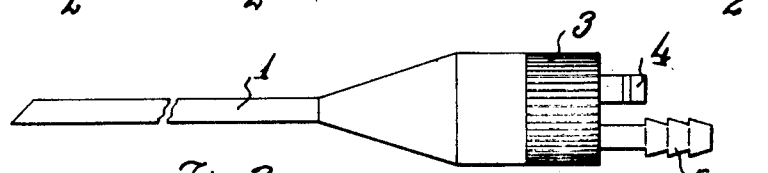
Fig. 3-a,
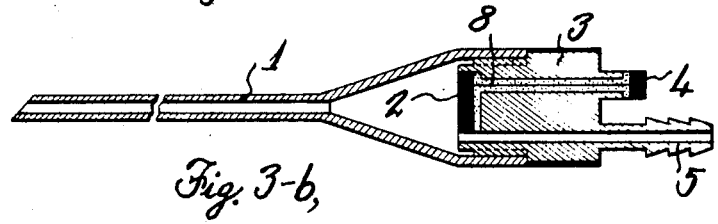
Fig. 3-b,
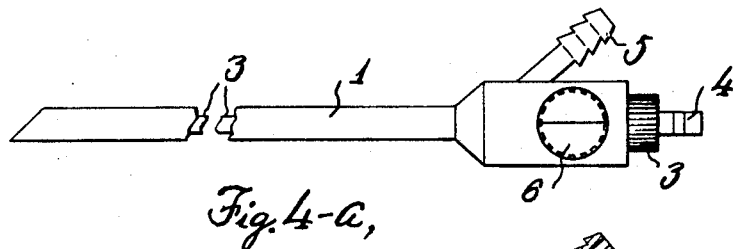
Fig. 4-a,
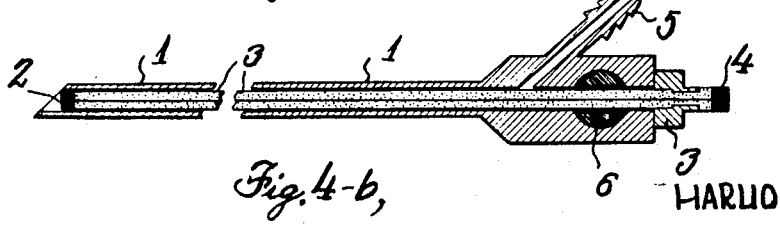
Fig. 4-b,
HARUO OMIZO,
INVENTOR.
BY Wendroth, Lind & Ponack.
Attorneys

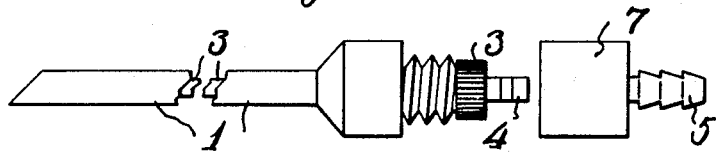
Fig. 5-a.
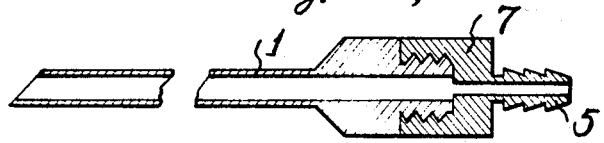
Fig. 5-b.
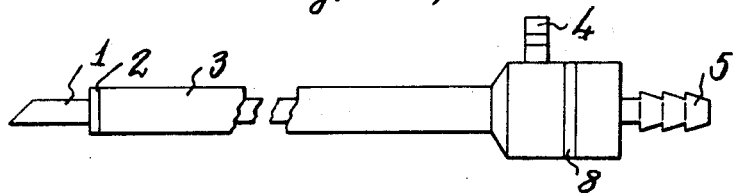
Fig. 6-a.
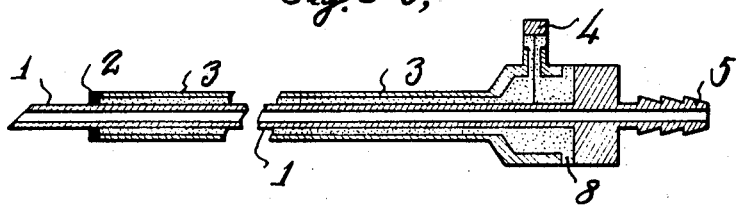
Fig. 6-b.
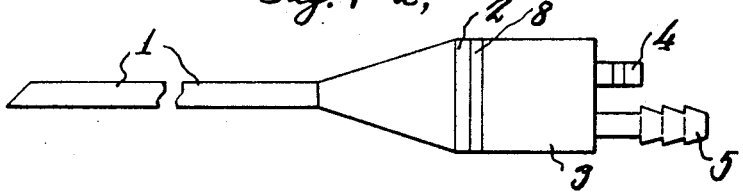
Fig. 7-a.
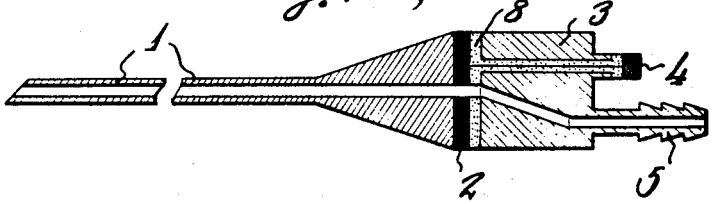
Fig. 7-b.
HARUO OMIZO,
INVENTOR.

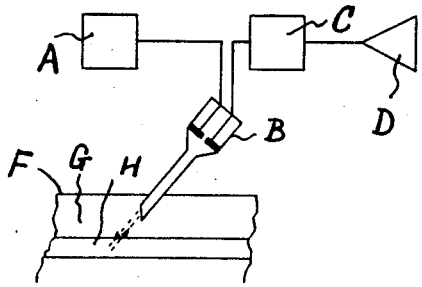
Fig. 8-a,
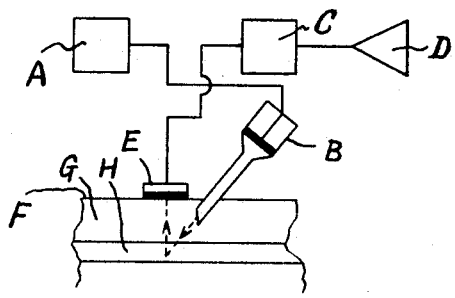
Fig. 8-b,
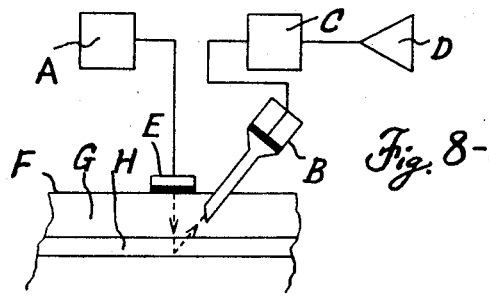
Fig. 8-c,
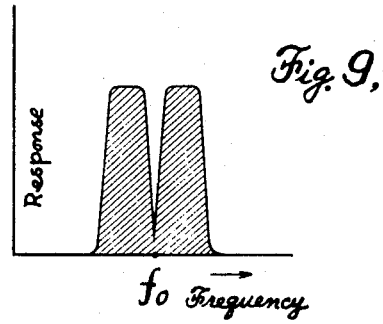
Fig. 9,
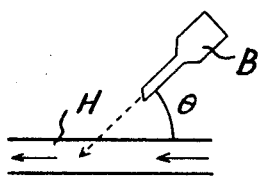
Fig. 10-a,
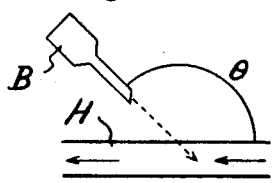
Fig. 10-b,
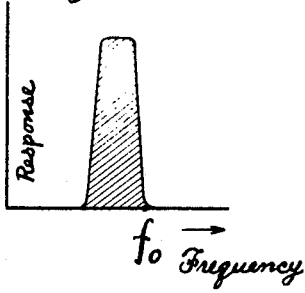
Fig. 11-a,
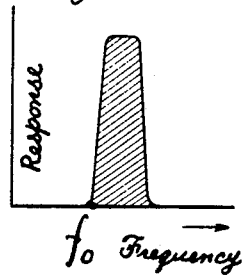
Fig. 11-b,
HARUO OMIZO,
INVENTOR.

METHOD OF PUNCTURING A MEDICAL INSTRUMENT UNDER GUIDANCE OF ULTRASOUND

This invention relates to a method of inserting a medical instrument under guidance of ultrasound, which is characterized by transmitting an ultrasonic beam toward the internal organs of the human body, receiving backscattered waves which have changed their frequency in accordance with the Doppler effect caused by the movement of a part of the internal organs, and utilizing the backscattered waves as a guide to insert a medical instrument such as a puncture needle so that the instrument can approach or reach or puncture the organ easily.

The object of the present invention is to operate a medical needle under guidance and let the medical needle approach or reach or puncture most accurately any internal organ aimed at by transmitting a sharp directional ultrasonic beam at a specific part of the body such as an artery, a vein or a lymphatic vessel which lies deep in the human body or at the heart, making use of variation in the frequency of backscattered waves which is caused by the Doppler effect in accordance with a shift inside such an internal organ or by movement of a part, thereof and measuring the depth and the direction to the part of the body from the surface of the human body.

The invention will now be described with particular reference to the accompanying drawings, in which:

FIG. 1 is a diagram of an embodiment of the present invention;

FIGS. 2a, 2b, 2c and 2d are front views of ultrasonic transducers used in the apparatus;

FIGS. 3a and 3b are an elevation and section view, respectively of one embodiment of a medical instrument having transducer means incorporated therein for use according to the method of the present invention;

FIGS. 4a and 4b are corresponding views of a similar instrument for use in the method of the present invention;

FIGS. 5a and 5b are corresponding views of a similar instrument for use in the method of the present invention;

FIGS. 6A AND 6B are corresponding views of a similar instrument for use in the method of the present invention;

FIGS. 7a and 7b are corresponding views of a similar instrument for use in the method of the present invention;

FIGS. 8a—8c are schematic diagrams illustrating different systems for carrying out the method of the present invention;

FIG. 9 illustrates the pass band frequency characteristics of the receiving apparatus;

FIGS. 10a and 10b are schematic diagrams of how to insert the medical needle;

FIGS. 11a and 11b illustrate a direction of inserting the medical needle and pass band frequency characteristics of the receiving apparatus for FIGS. 10a and 10b respectively.

The equipment used in the present invention consists of, as shown in FIG. 1, a transmitting apparatus A, a medical needle B, a receiving apparatus C and an indicating apparatus D such as a loudspeaker or a cathode-ray oscilloscope.

The medical puncture needle in the embodiment of the present invention contains a small ultrasonic transducer (e.g. a PZT product) having a shape as shown in FIG. 2a, 2b, 2c or 2d, which is set on a part of a fixed or removable supporter either inside the end of the needle or in the expanded base of the needle as shown in FIG. 3a and 3b, FIG. 4a and 4b and FIG. 5a and 5b or is positioned outside of the needle as shown in FIG. 6a and 6b or is included in the needle base as shown in FIG. 7a and 7b.

The transmitting apparatus A is a high frequency crystal oscillator operating at a frequency of 5 MHz and of about 1 watt output power to excite the ultrasonic transducer which is set inside the needle or which is used separate from the needle.

The receiving apparatus C is a single superheterodyne receiving system and consists of a mixer, a local oscillator, an intermediate frequency amplifier having a narrow pass band which makes use of a mechanical filter, a detector and an audiofrequency amplifier. The pass band for the high or intermediate frequency amplifier is set a special frequency characteristic related to the frequency distribution of the backscattered waves which varies due to the Doppler effect. By using this characteristic, it becomes possible to produce a large amplification in that stage and, thus, makes sensitivity very sharp.

These days, in order to find a lesion in the brain or the heart or abdominal organs or limbs, it is regarded as an important method of examination to take an X-ray photograph of a vessel by inserting a puncturing tube (e.g. a needle, a catheter, etc.) into a body part, particularly an artery or a vein, and injecting a contrast medium therethrough.

However, it requires a highly advanced technique to measure the depth, and the direction from the surface of the human body to a deeply situated body part (particularly, an artery) and to insert the needle into it accurately. It is not rare that, when the contrast medium is injected after inaccurate insertion of the needle, neighboring tissues of the blood vessel are damaged by rupture or obstruction of the vessel or by leakage of the contrast medium and consequently a patient is caused to die. The present invention enables accurate directing of the needle from the surface of the human body to the body part aimed at.

The following sets forth the principle and the method of inserting of the needle under guidance of ultrasound in accordance with the present invention.

When high frequency power is fed by a transmitter to an ultrasonic transducer which is set on a part of the needle of the present invention, a sharp directional ultrasonic beam of a constant frequency is transmitted in the inserting direction deep into the human body when the needle point is contacted with or inserted into the skin. And when a blood vessel is situated within the scope of the transmitted ultrasonic beam, transmitted ultrasonic waves are given the Doppler effect due to the movement of corpuscles in that blood vessel or due to a turbulance of the blood flow or due to the pulsation of the vascular wall, and thereby they produce backscattered ultrasonic waves of a different frequency. The backscattered waves are caught and converted into an electrical signal by a receiving transducer placed on the skin surface over the blood vessel, and then amplified and detected. Thereby, an electrical signal of audiofrequency is obtained. By amplifying it and then leading it to a loudspeaker, it can be heard as a kind of audible sound.

For example, by setting the transmitting frequency to 5 MHz and receiving the detected sound as a beat signal which is equivalent to the difference between the frequency of transmitted waves and the frequency of lb backscattered waves, it is found that the detected sound from an artery is generally an audible sound which changes its tone in accordance with a cardiac cycle of less than about 5,000 Hz and that the detected sound from a vein is an audible sound which does not change in accord with the cardiac cycle of less than 2,000 Hz, but which changes in accord with the breathing cycle. These detected sounds a maximum volume when the transmitted ultrasonic beam is directed at the center of the section of the vessel aimed at; on the contrary, they suddenly disappear when the ultrasonic beam fails to impinge or on the vessel aimed at, even when the beam is only slightly spaced from the vessel. Further, if the ultrasonic beam impinges on tissue which does not move, the backscattered waves therefrom are not given the Doppler effect and have the same frequency as the transmitted waves, and hence no sound is detected.

Thus, the use of a medical needle manufactured in accordance with the present invention enables the needle to approach or puncture a body part such as a blood vessel easily and accurately by transmitting a sharp directional ultrasonic beam in the direction of inserting, receiving the backscattered waves from the part constantly, and adjusting the position or the direction of inserting the needle so as to obtain the maximum detected sound.

FIGS. 7a-8c illustrate three methods of inserting the needle, in which then the needle point has passed through the skin F and remains in the subcutaneous tissue G. In the method of FIG. 8a, a transducer for transmitting an ultrasonic beam which is on a part of the needle transmits an ultrasonic beam to a vessel H and a receiving transducer which is on another part of the needle catches the backscattered waves. In the method of FIG. 8b, the ultrasonic beam is transmitted from a transmitting transducer which is on a part of the needle, but the backscattered waves are caught by a separate receiving transducer E placed on the skin. In the method of FIG. 8c, the ultrasonic beam is transmitted from the separate transmitting transducer placed on the skin and the backscattered waves are caught by the receiving transducer on a part of the needle.

Now, there is a problem that the backscattered waves from a small blood vessel or a blood vessel situated deep in the human body are so weak that, even if they can be amplified and detected as they are, it is difficult to obtain a satisfactory detected sound due to masking by the leakage of transmitted high frequency.

However, as shown in FIG. 9, by inserting a filter to eliminate only a frequency ($fo$ corresponding to the transmitting frequency (in case of a superheterodyne receiving system, a converted intermediate frequency is equivalent to the transmitting frequency) of a high or intermediate frequency amplifier of the receiving apparatus, it was possible to get a large gain at the high or intermediate frequency amplifier stage without saturation by the leaked transmitting high frequency, and thus a strong detected sound could be obtained.

Further, as shown in FIG. 10a, when an angle $\theta$ between the direction of inserting the needle, i.e. the direction of the impinged ultrasonic beam, and the direction of the blood flow in a vessel is acute, the frequency of the backscattered waves becomes lower that that of the transmitted waves as the result of the Doppler effect. On the other hand, as shown in FIG. 10b, when the angle $\theta$ is obtuse, the frequency of the backscattered waves becomes higher.

By utilizing the above-mentioned fact, when the angle was acute as shown in FIG. 10a, the amplified frequency pass band of the receiving apparatus was made a little lower than the transmitting frequency as shown in FIG. 11a, and when the angle $\theta$ was obtuse as shown in FIG. 10b, it was made a little higher as shown in FIG. 11b. By using this technique, it was possible to get a larger gain in amplification at the frequency range which was related to the frequency distribution of the backscattered waves rather than to the transmitting frequency in the high or intermediate frequency amplifier without fear of suppression due to saturation by the leaked transmitting high frequency. Further, by inserting a very narrow band pass filter such as a mechanical filter into the intermediate frequency amplifier and, thus, by narrowing the general pass band of the receiving apparatus, it was possible to sharpen the sensitivity of the receiving apparatus and obtain a strong detected sound.

For shifting the relations between the transmitting frequency and the receiving frequency, there are such methods as (1 to slightly change the transmitting frequency, (2 to slightly change the tuned frequency of the high or intermediate frequency and (3), in case of a superheterodyne system, to slightly change the frequency of the local oscillator. Actual tests have proved that such changes are possible by exchanging the crystal unit of the oscillating circuit of the transmitting or receiving apparatus, or by changing the variable capacitance which is inserted parallel to the crystal unit, or by changing the DC voltage which is to be fed to the variable capacitance diode.

Now, the structure and the use of the medical needle of the present invention will be explained in the following with reference to the attached drawing. Hereinafter, the same reference number represents the same part in every drawing.

FIG. 3a is a side view and FIG. 3b is a vertical section. The base of the needle has a conical part or a conical part with curved internal surface (e.g. exponential curve); a comparatively large transducer 2 is mounted on the end of supporter 3 which holds the bottom of the needle base; the lumen of the needle is filled with saline solution poured thereinto through a joint 5 with a polyethylene tubing; an ultrasonic beam is transmitted through the saline solution; a terminal 4 is provided for connecting cables to the transmitting apparatus or the receiving apparatus; an adhering and insulating agent 8 made of an epoxy resin or glass fiber fills the space around the cable and holds the transducer 2 on the support 3. FIGS. 4a, 4b, 5a and 5b show how a combination of the transducer 2 and the supporter 3 can be mounted in the needle in such a way that they can be pulled out afterwards. The ultrasonic beam is transmitted from inside of the needle in the direction of inserting and, after the needle approaches the body part or punctures the body part, the transducer 2 and the support are pulled out. In FIGS. 4a and 4b a cock 6 turns 90° for closing the hold left when the transducer 2 and support 3 are withdrawn; while, in FIGS. 5a and 5b a connecting piece 7 having the coupling 5 thereon is threaded onto the base of the needle immediately after the transducer 2 and the support 3 are withdrawn. Further, FIG. 4b shows how the transducer 2 and the support 3 are mounted in the needle. FIG. 5b shows the situation after the transducer 2 and the support 3 have been withdrawn and the connecting piece threaded into place.

FIGS. 6a and 6b show a structure in which the transducer 2 and the support 3 are mounted around the outside of the needle.

In FIGS. 7a and 7b, the transducer 2 is mounted by an adhering and insulating agent 8, on the end of the support 3 which end is attached to the bottom of the needle base, and the ultrasonic beam is transmitted along the internal wall of the needle.

In the present-day brain surgery, an operation such as to extirpate the brain tissue after a craniotomy and ligation of or reinforcing of a blood vessel situated deep in the brain is generally employed as a curative means to prevent cerebral hemorrhage caused by the rupture of an intracranial hemangioma, aneurysm, etc. However, such an operation as above mentioned contains a great possiblity possibility of endangering one's life due to the operation itself or bringing about a serious postoperative symptom.

The equipment of the present invention can be applied to such a case by making a hole of a few millimeters in diameter in the cranium, inserting the needle through the hole, leading the needle to the lesion under the guidance of the detected sound obtained from a blood vessel, and then pouring a resin material around the lesion for reinforcing the aneurysm or vascular wall. Thus, it is possible to prevent the rupture of a blood vessel or an aneurysm by such a method which causes a little surgical damage to neighboring tissue. Further, by setting the ultrasonic transducer in a forceps, a radio knife, a clip or other medical instruments and by operating them under guidance of the detected sounds, it becomes possible to let the medical instruments approach or reach or puncture a body part without exposing the body part such as a deep lying vessel or the heart, and thus surgical operations will become safer.

In conclusion, the method of the present invention makes it possible for a medical instrument such as a puncture needle, a catheter, a bougie, a sound, a scalpel, a clip, a forceps, etc. approach or reach or puncture a body part such as a vessel or the heart or tissue related to these parts safely and accurately, due to which it becomes possible to make a correct diagnosis easily and give further advanced special treatment.

I claim:
1. A method of inserting a medical instrument into a body under the guidance of ultrasound, comprising the steps of actuating a transmitting transducer means to transmit a beam of ultrasonic sound waves into the human body toward a moving part, picking up backscattered waves on a receiving transducer means the frequency of which have been changed due to the Doppler effect by the movement of the part toward which the beam is directed, at least one of said transducer means being mounted on said instrument, converting the received backscattered waves into an electrical signal having an audiofrequency amplifying the audiofrequency signal and reproducing it as an audible signal, and inserting the medical instrument into the body and guiding it toward the moving part by adjusting the position or the direction of insertion so as to obtain the maximum detected sound.

2. A method as claimed in claim 1 in which the transducer means for tramsmitting and receiving ultrasonic waves are both mounted on a part of the medical instrument and directed in substantially the same direction as the instrument extends during insertion.

3. A method as claimed in claim 1 in which the ultrasonic tram transmitting transducer means is on said medical instrument and said ultrasonic receiving transducer means is applied to the body into which the instrument is being inserted.

4. A method as claimed in claim 1 in which the ultrasonic receiving transducer means is on said medical instrument and said ultrasonic transmitting transducer means is applied to the body into which the instrument is being inserted.

5. A method as claimed in claim 1 in which the instrument is inserted toward a vessel or artery and said receiving transducer means has a pass band for the amplified signal which has a frequency almost the same as the frequency distribution of the backscattered waves, being slightly less when the angle between the direction of insertion of the instrument and the flow of blood in the vessel or the artery is obtuse and being slightly more when the angle between the direction of insertion of the instrument and the flow of blood in the vessel or the artery is acute, whereby the gain in amplification in the frequency range corresponding to that of the backscattered signal is greater than the gain in amplification corresponding to the transmitting signal.